United States Patent [19]

Dusard et al.

[11] 4,410,841
[45] Oct. 18, 1983

[54] ROPING AND MOIRE REDUCTION IN PATTERNED SCREEN CATHODE RAY TUBE DISPLAYS

[75] Inventors: Christopher R. Dusard; Thomas W. Spilsbury, both of Phoenix, Ariz.

[73] Assignee: Sperry Corporation, New York, N.Y.

[21] Appl. No.: 306,452

[22] Filed: Sep. 28, 1981

[51] Int. Cl.³ .......................................... H01J 29/58
[52] U.S. Cl. ............................... 315/382; 315/31 R; 358/161
[58] Field of Search ............... 315/382, 31 TV, 31 R; 358/161, 218

[56] References Cited

U.S. PATENT DOCUMENTS

3,814,852  6/1974  Mierzwinski .................. 358/161
4,037,133  7/1977  Sennik ........................ 315/31 TV
4,105,912  8/1978  Senger ........................ 343/5 CD

*Primary Examiner*—Theodore M. Blum
*Attorney, Agent, or Firm*—Howard P. Terry

[57] ABSTRACT

In a patterned screen color cathode ray tube (CRT) display, for example, a shadow-mask type color CRT, particularly for use under a wide range of ambient light conditions, such as an aircraft cockpit, incompatibilities between the screen pattern character, the type of writing (such as stroke and raster), and the display linewidth, may result in stroke written lines which appear as a twisted fiber rope and in raster written areas which appear wavy or watery; that is, a moire appearance. Both of these effects vary in accordance with the required display brightness over the ambient light range due to variations in beam or linewidth with corresponding variations in the required cathode drive voltages. These undesirable roping and moire effects are eliminated or substantially eliminated by varying the electron beam focus in accordance with a computed reference brightness compatible with the range of ambient brightnesses in a manner to maintain a predetermined, substantially fixed beam width for stroke written symbols and effective line spacing for raster written symbols.

9 Claims, 6 Drawing Figures

ROPING AND MOIRE REDUCTION IN PATTERNED SCREEN CATHODE RAY TUBE DISPLAYS

CROSS REFERENCE TO RELATED APPLICATIONS AND PATENTS

The present invention is related to applicants' assignee's copending patent applications Ser. No. 304,451, filed Sept. 22, 1981, now U.S. Pat. No. 4,386,345 in the name of Narveson et al and entitled "Color and Brightness Tracking in a Cathode Ray Tube Display System", and Ser. No. 258,991, filed Dec. 24, 1980 in the name of Chase et al and entitled "Dynamic Convergence Control Apparatus for Shadow Mask CRT Displays", and to applicants' assignee's U.S. Pat. No. 4,258,298 issued on Mar. 24, 1981 to Hilburn et al entitled "Dynamic Focus Control and Power Supply for CRT Displays". The aforementioned applications and patent are incorporated herein by reference.

BACKGROUND OF THE INVENTION

1. Field of the Invention

The present invention relates generally to color cathode ray tube (CRT) display apparatus and more particularly to CRT displays used in applications under which the ambient light conditions vary over a very wide range. One such application is an aircraft cockpit wherein the ambient light can vary from direct, high altitude sunlight to almost total darkness. High contrast enhancement filter techniques which may be of the type disclosed in the present assignee's U.S. Pat. No. 3,946,267 are used to maintain the desired contrast ratios under such light ambients. More specifically, the present invention relates to CRT display apparatus; for example a shadow-mask type color CRT, for use in such ambient light conditions which automatically adjusts the focus of the CRT beams in accordance with a variable reference brightness and in accordance with the display writing technique being used, e.g., raster or stroke, in a manner to maintain a substantially constant display linewidth over the brightness range for the purpose of eliminating or substantially eliminating any roping and moire effects.

2. Discussion of the Prior Art

As is well known in the shadow-mask color CRT art, both "roping" and "moire" effects result from the interaction of the electron beam with the size, spacing and pattern of the individual primary color phosphor dots. A roping effect (a line which appears as a twisted fiber rope) results when the effective electron beam width does not span a sufficient area of the dot pattern. A narrow beam tends to isolate individual dots or dot patterns and at certain beam line orientations so that dots lie diagonally across the beam trace. A moire effect results when, given a fixed center-to-center line separation, the regular individual lines of the raster pattern are of a width such that the spacing between the lines interferes with the regular row and/or column pattern of the phosphor dots. This interference pattern will normally result when the effective raster line spacing produced by a particular line width approaches the row or column pitch of the dot matrix. Thus, in each case the only controllable factor, for any given CRT shadow-mask characteristic, is the electron beam width.

In most prior art CRT display systems, such as for example, home and commercial TV's, where normal viewing ambient light conditions do not vary significantly or where if viewing is in high ambient light conditions mechanical shades or baffles are used to prevent direct sunlight from impinging upon the CRT face, essentially a fixed predetermined reference beam width or focus voltage is established based primarily upon the particular phosphor dot pattern and dimensions, to define a desired linewidth so that roping and moire is minimized and is thereafter left unchanged even with manual changes in brightness. Such techniques, while useful in home and commercial TV apparatus are not useful in CRT displays in which the brightness of the displayed symbology must be varied over a wide range to accommodate the wide range of ambient lighting.

In applications where a fixed display format is required other possible methods can be used to eliminate moire in a raster presentation. If a fixed linewidth is required the resolution of the phosphor dot pattern can be increased thus eliminating the moire effects. Furthermore, the orientation of the phosphor dots can be changed to the optimum configuration during the design of the CRT to minimize moire effects. Unfortunately the above solutions are technically difficult and very expensive.

SUMMARY OF THE INVENTION

A color cathode ray tube display apparatus of the shadow-mask type or other type of multiple color tube having a predetermined phosphor element pattern and dimensions, such as the beam index tube, particularly adapted for use in an aircraft instrument panel; for example, an electronic flight instrument, where the display face and the pilot's eyes are subjected to a very wide range of ambient light from direct sunlight (e.g., $10^{+4}$ foot candles) to substantially total darkness (e.g., $10^{-2}$ foot candles), preferably includes a dedicated digital microprocessor and associated RAM's and PROM's which, among other CRT related functions, is programmed to control the CRT's focus, through a suitable dynamic focus power supply, to provide a plurality of predetermined focus voltages in accordance with the display brightness relative to the cockpit ambient brightness to thereby maintain a substantially constant predetermined beam width over the entire ambient light intensity spectrum to which it and the pilot's eyes are subjected. Additionally, in color CRT displays which are capable of displaying information using both raster and stroke writing techniques, the beam width is varied under processor control in accordance with the writing technique being commanded.

The foregoing is accomplished by repetitively calculating, using the speed of a digital computer, reference display brightness from measures of the pilot's brightness setting and ambient cockpit brightness, as disclosed in the referenced Narveson et al application, and then using this reference brightness to address a memory stored table of predetermined digitized focus voltages which upon being D/A converted are in turn used to control the CRT focus electrode to maintain a substantially constant beam width over the brightness range, which beam width is required to eliminate or substantially eliminate any roping and moire effects in the resulting display. Since the magnitude and resolution of the required predetermined focus voltages may vary differently from CRT to CRT even of a particular type, they are predetermined for each CRT and stored in a characterization or personality PROM attached to the CRT so that upon installation in the display system, no costly calibration is necessary.

BRIEF DESCRIPTION OF THE DRAWINGS

A preferred embodiment of the present invention is illustrated in the attached drawings wherein.

DESCRIPTION OF A PREFERRED EMBODIMENT

A typical electronic flight instrument system for an aircraft usually comprises two basic units; a display unit mounted in the aircraft cockpit, such as on the control panel, and a symbol generator unit normally mounted in the aircraft's electronics bay, the former displaying the flight control, flight navigation, and annunciation or status information generated by the symbol generator. Multiple identical display units may be employed each displaying the desired flight data, such as a primary flight display (attitude, flight director, etc.) and a navigation display (map, weather radar, etc.) which may be driven by a single symbol generator. Multiple display units (pilot's and copilot's instruments) may also be driven by dual symbol generators, suitable switching control panels being provided for any desired manual and/or automatic cross switching between symbol generators and display units. However, the invention is applicable to any color CRT display subjected to wide ranges of ambient light conditions. The display unit of such an overall system is the subject of the present invention. More specifically, since each of the display units is subject to a very wide range of ambient light conditions and since the units are located at different positions in the aircraft panel or cockpit and are therefore subject to different ambient light conditions within the overall cockpit ambient, the apparatus of the present invention automatically adapts the pilot's selected brightness of each display unit to such ambient conditions.

Figure 1:
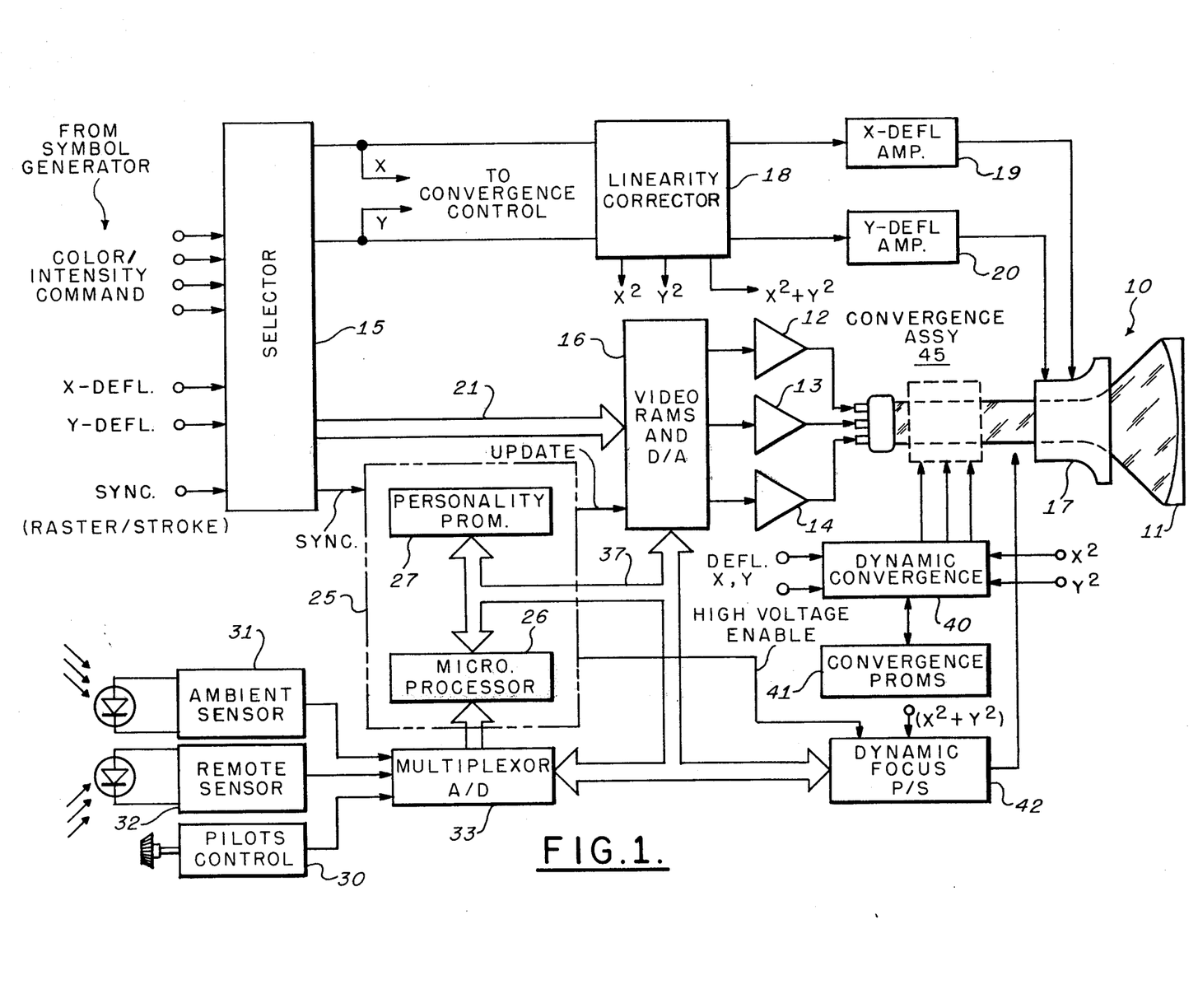
FIG. 1 is a block diagram of that portion of a CRT display unit pertinent to the present invention and illustrating the digital microprocessor controller dedicated to the operation of the CRT.

As described in the referenced Narveson et al application, FIG. 1 illustrates those portions of the display unit pertinent to the automatic focus tracking apparatus of the present invention. In general, the display unit comprises a conventional shadow-mask color CRT 10 having a contrast enhancement filter 11, which may be of the type disclosed in the above U.S. Pat. No. 3,946,267, bonded to its faceplate, such as in the manner taught in Applicants' assignee's U.S. Pat. No. 4,191,725. It will be appreciated that in the interest of clarity and brevity certain CRT apparatus and controls such as high voltage power supplies, phosphor protection circuits and the like have been omitted. Conventionally, the CRT display includes conventional deflection yoke 17 responsive to X and Y deflection commands supplied by a suitable symbol generator (not shown) through multiplexer selector 15, linearity corrector 18 and X and Y deflection amplifiers 19 and 20, respectively, all as taught in the prior art, such as the present assignee's U.S. Pat. Nos. 3,499,979; 3,786,303 and 3,965,390. The dynamic convergence control 40 assures color convergence over the entire screen face and may be of the type disclosed in the above mentioned Chase et al application, its outputs being used to control the convergence assembly 45. It receives beam deflection signals X and Y from multiplexer 15, digital convergence signals from convergence PROMS 41 and signals $X^2$ and $Y^2$ from linearity corrector 18 and generates primary color convergence compensation signals. The $X^2$ and $Y^2$ signals are used in dynamic focus control power supply 42, which is illustrated schematically in FIG. 4 and which is disclosed in detail in the above referenced Hilburn et al patent. The low frequency variable focus voltage in accordance with the present invention is supplied by the controller 25 on data bus 37 as will be described below. The high voltage enable signal provided to the dynamic focus control power supply 42, as discussed in said U.S. Pat. No. 4,258,298, is provided in the present embodiment of the invention from the controller 25.

Conventionally, the shadow-mask CRT includes green, red and blue cathodes, not shown, for emitting the three electron beams which excite the corresponding green, red and blue phosphor triads through the screen aperture pattern, the filtered output light intensity of each excited phosphor, in foot lamberts, varying in accordance with the voltage applied to each cathode in a determinable manner, such ratio being referred to as the gamma ($\gamma$) for each primary color and which may vary from tube to tube. The green, red and blue cathode drive voltages are supplied from corresponding video amplifiers 12, 13 and 14, respectively. Also conventionally, the electron gun assembly includes primary focus electrodes, not shown, responsive to the focus power supply assembly 42 for collectively controlling the focus of the three beams so as to control the effective width of the converged beams as they exit the shadow-mask holes and excite the corresponding phosphor dots.

The basic video drive command is supplied from the symbol generator, not shown, through a conventional selector or multiplexer 15 synchronized with the refresh rate of the symbol generator. A typical format for the video command from the symbol generator is a four bit digital word which can provide for eight different colors (including video blanking as black) and two different commanded intensities for each color. The video command is used to address green, red and blue video RAMs 16 via address bus 21, the digital RAM outputs being converted to analog green, red and blue cathode drive voltages through conventional DAC's to produce the desired or commanded color and intensity of the symbols drawn on the tube face by the deflection system, all as discussed in detail in the aforementioned Narveson et al application Ser. No. 304,451.

It should be pointed out here that the present invention is applicable to display systems wherein the symbol generator drives two or more separate display units or only one display unit. It is also applicable to display systems involving one or more displays which are all raster written or all stroke written or both raster and stroke written. In the dual, raster and stroke written display unit system, it is convenient to control system timing such that when one display unit is being raster written, the other is being stroke written. When a single display unit is being used raster and stroke writing may be used alternately, e.g., stroke write during raster flyback. Thus, the sync signal illustrated in FIG. 1 may be a stroke/raster command signal as will be further described below.

In accordance with the teachings of the present invention, the display unit includes a display unit controller 25 which in turn includes its own dedicated digital microprocessor 26. This processor together with personality data, contained in a personality PROM 27, unique to the display unit's specific CRT, adapts the displayed symbology or information to the pilot at the contrast or brightness level he has manually selected, and thereafter automatically adjusts the individual color cathode drives to maintain the originally commanded color over the entire ambient brightness conditions in accordance with said Narveson et al application Ser. No. 304,451 and simultaneously automatically sets the focus voltage in accordance with these brightness conditions as will be described below in accordance with the present invention. The microprocessor 26 may be any one of a number of readily available microprocessors and in the present embodiment may be one of the M6800 series, such as a M6802 available from Motorola, Inc., Schaumburg, Ill., while the PROM 27 may be any conventional programmable or alterable read only memory such as a voltage programmable ultraviolet erasable PROM. As stated, the personality PROM 27 contains parameters unique to a specific CRT and hence a particular CRT assembly is designed to include its own PROM as an integral part thereof whereby if a display unit CRT assembly requires replacement no calibration of the new CRT assembly is required. Although the personality PROM may contain a number of parameters dependent upon the peculiar characteristics of the CRT to which it is tailored such as vertical and horizontal centering and sensitivity constants, phosphor protection constants, etc., it also includes the tube's output brightness versus cathode drive voltage characteristic for each color phosphor, the reflectance characteristics peculiar to the tube's particular faceplate, filter, antireflectance coating, and in accordance with the present invention, predetermined beam focus parameters for controlling the beam width so as to eliminate roping and moire effects.

Before discussing the reference brightness computer program and the generation of the focus voltages required to eliminate any roping or interference patterns, a brief discussion of these effects will be useful in understanding the present invention. In a shadow-mask CRT, the regular spacing of the raster lines and the regular patterning of the screen dot pattern may interfere to form moire interference patterns in a raster written presentation while in stroke written presentation the same dot pattern may produce roping effects. There is a very definite lower limit on the linewidth or beam width below which these distracting patterns appear on the display screen. It is this lower limit in linewidth that dictates the resolution capability of the CRT. The minimum linewidth allowable is dependent upon the spacing of the dot pattern; for example, in a standard high-resolution CRT with spot triad pitch of say, 0.012-inch, the minimum half intensity linewidth (Gaussian distribution) is on the order of 0.016-inch. A higher resolution CRT with an even lower triad pitch will accommodate a corresponding lower linewidth. The resolution capability of the CRT may be analyzed by considering the beam as it impinges on the shadow-mask. For a raster pattern consisting of individual lines of Gaussian profile (reasonable for moderate drive levels), and modulated synchonously so as to produce vertical bar patterns, an expression for the modulation percent M can be derived:

$$M = \frac{2 \exp{(\pi s/2b \sqrt{\ln 0.5})^2}}{1 + 2(B_A/B_S) + \exp{(\pi s/2b \sqrt{\ln 0.5})}}$$

where
s = the linewidth at the half power point,
b = the bar spacing (width of a line pair),
$B_A$ = Ambient brightness = RA,
$B_S$ = Symbol brightness = $B_o$.

For moderate beam currents and at screen center, the modulation percent achievable with a 0.016-inch linewidth is found to be 2 percent under 150-foot lambert ambient light conditions for a 70-line pair/inch resolution requirement. The percent modulation for the narrower minimum line width of a higher resolution CRT will of course be correspondingly higher.

The actual dot spacing of a typical color CRT screen is of little contribution to the resolution capability of the CRT except for thin, highly linear symbology such as straight lines or scales when aligned or closely aligned with the dot rows or columns. In this case, the orientation of the dot pattern is of consequence. It will be appreciated that in a typical triangular dot pattern, the row pitch between horizontal rows containing dots of a given color is less than the column pitch between vertical columns containing dots of the same color. This would mean that in principle, the vertical resolution of such a dot pattern, i.e., a vertical line raster, would be higher than that of a horizontal line raster. In the best raster axis, the hole-spacing-limited resolution to obviate moire would be 83 line-pairs per inch at, for example, about 0.016 inch width for a typical 0.012 inch pattern triad pitch. It has been determined that such predetermined line or beam width results in no or minimal roping effect. In fact, however, by defocusing the beam in accordance with the invention, this resulting trace is large compared to the dot triad pitch. This fact, combined with the integrating and extrapolating capability of the human eye, makes the beam width the dominant resolution factor for all normal raster or stroke video presentations in reducing or eliminating roping and moire.

As explained in detail in said Narveson et al application Ser. No. 304,451, each CRT is characterized by measuring the brightness output, including any filters, of each of its primary color phosphors for a plurality of cathode voltages applied to each color's cathode and if the symbology is to be stroke and raster written separate similar measurements must be made for each writing technique. Conventional optical equipment may be used for this purpose and on a production basis the curve plotting may be automatic. The result of such measurements of a typical CRT may be plotted as a curve of brightness versus voltage values. Note that stroke written symbology will be much brighter than raster written symbology for the same cathode voltages. This is due to the much slower beam deflection rates required to draw stroke written symbols than that required to draw raster written symbols.

The brightness versus cathode drive voltage curves are analyzed and a number of points on each curve are selected, each of which represent the specific drive voltage required to produce a corresponding symbol color and brightness.

Curve points are established, the corresponding cathode drive voltages for all three primary color components for all commandable colors for both stroke and raster writing modes being assembled in six color/gain tables and these tables are conventionally stored in digitized format in a digital programmable memory, such as PROM 27, each memory location corresponding to a desired brightness and containing the particular cathode voltage drive required to produce the desired brightness. Each memory is addressed in accordance with the value of the reference brightness in foot lamberts computed by the microprocessor 25 in accordance with the computer program represented by the flow chart of FIGS. 2A and 2B, as explained in detail in said Narveson et al application Ser. No. 304,451.

In accordance with the present invention, CRT beam width is automatically controlled with the reference brightness signal that is used to control the color brightness/contrast as described in the Narveson et al application over the very wide range of ambient light conditions experienced in the cockpit of an aircraft and in accordance with the operative mode (stroke or raster) of the system.

Figure 3:
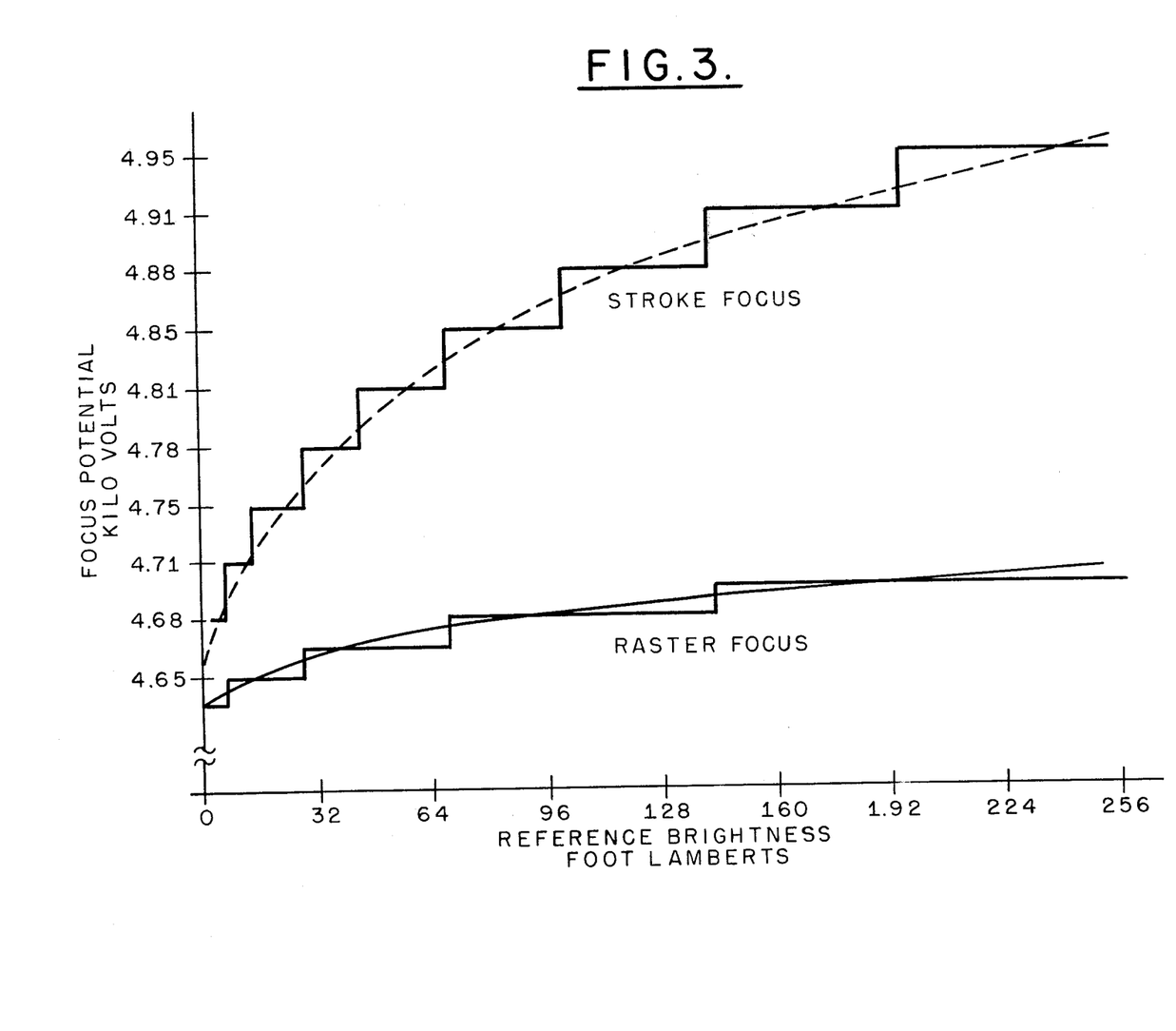
FIG. 3 is a diagram of brightness output versus focus voltage curves for both raster and stroke written symbology of a typical shadow-mask type color CRT display.

In a manner similar to that used to generate the color brightness versus cathode modulation curves, the brightness versus focus voltage curves, for both stroke written and raster written symbology, required to produce a constant beam width which results in no roping or moire effects are generated. During calibration of a CRT, fixed test patterns are presented on the screen. These patterns, both stroke and raster, are arranged such that the worst case roping/moire effects are evident. Then in accordance with a predetermined maximum roping/moire specification, focus voltages are determined for a plurality of cathode drives that most effectively eliminate roping/moire effects. This can be done either manually under an operator's control or automatically by conventional calibration/test equipment. In either event, the focus data is used to generate individual focus curves for both stroke symbology and raster symbology. A typical set of such curves is illustrated in FIG. 3.

After the curves have been established, they are analyzed and a number of points on each curve are selected, each of which represent the focus voltage required to produce the desired beam width at the corresponding reference brightness or cathode drive voltage for both stroke and raster written symbology. These focus voltages are digitized and conventionally stored in the programmable memory 27 which will be addressed in accordance with the value of the reference brightness computed by the microprocessor 25 under control of the program of FIGS. 2A and 2B.

The microprocessor is programmed to compute the focus control voltages required by the specific characteristics of the CRT dependent upon the pilot selected brightness as set by selector 30, and in accordance with one or more ambient light sensors 31 in the cockpit, preferably closely adjacent to or built into the bezel of the display unit.

As described by Narveson et al, a further light sensor 32, preferably mounted on the glare shield and subjected to the light intensity forward of the aircraft, may be employed to further boost the tube brightness in accordance therewith. The purpose of this remote light sensor is to compensate for the relatively slow response of the pilot's eyes in adapting to the interior cockpit lighting after looking out of the cockpit front windshield. In applications of the invention involving two companion and usually adjacent display units, such as a primary flight display unit and a navigation display unit, each having its own ambient light sensor, it is desirable that the ambient light sensed by each be compared by conventional means not shown, and the greatest of these inputs used to adjust the brightness of both display units so that the brightness of both units is always the same.

Thus, the pilot selected brightness signal generated as an analog voltage by selector 30, the cockpit light sensor signal generated as an analog voltage by, for example, an optical diode associated with sensor 31 and the glare shield sensor signal generated as an analog signal by an optical diode associated with sensor 32 are all supplied to a conventional analog selector or multiplexer 33. Each of these signals is called up by the microprocessor brightness control program through conventional latches (not shown) responsive to program decoder (not shown) as they are required. Each analog input signal is converted to digital signal format by a conventional A/D converter associated with multiplexer 33 which signal is supplied to the microprocessor 26, all using conventional and well known digital techniques, all as explained in said Narveson et al application.

As stated above, the display controller 25 with its dedicated microprocessor 26 manages the video processing circuitry and guarantees precise chromaticity for all colors and a corresponding precise, predetermined beam linewidth throughout the entire range of display unit brightness levels. The command word is used to address the video RAMS 16 via video address bus 21 either singly or in combinations of two or three to produce all predetermined distinct colors. Each of the video RAMS is loaded by the controller 25 with digital data representing all the cathode modulation voltages required to produce all commanded colors at intensity levels dependent upon the ambient light conditions existing in the cockpit. The RAM address bus 21 selects the three voltages required to produce the color and intensity commanded by the symbol generator. The display controller 25 is programmed so as to monitor the pilot's brightness selector and track the cockpit ambient light sensors and automatically update the contents of the video RAMS to assure that each of the cathode drive voltages are such as to maintain precise chromaticity of the commanded colors over the entire range of display brightness levels, all as explained in Narveson et al, and to simultaneously automatically set the focus voltage required to maintain the required beam width under the cathode drive conditions in accordance with the present invention.

Figure 2A:
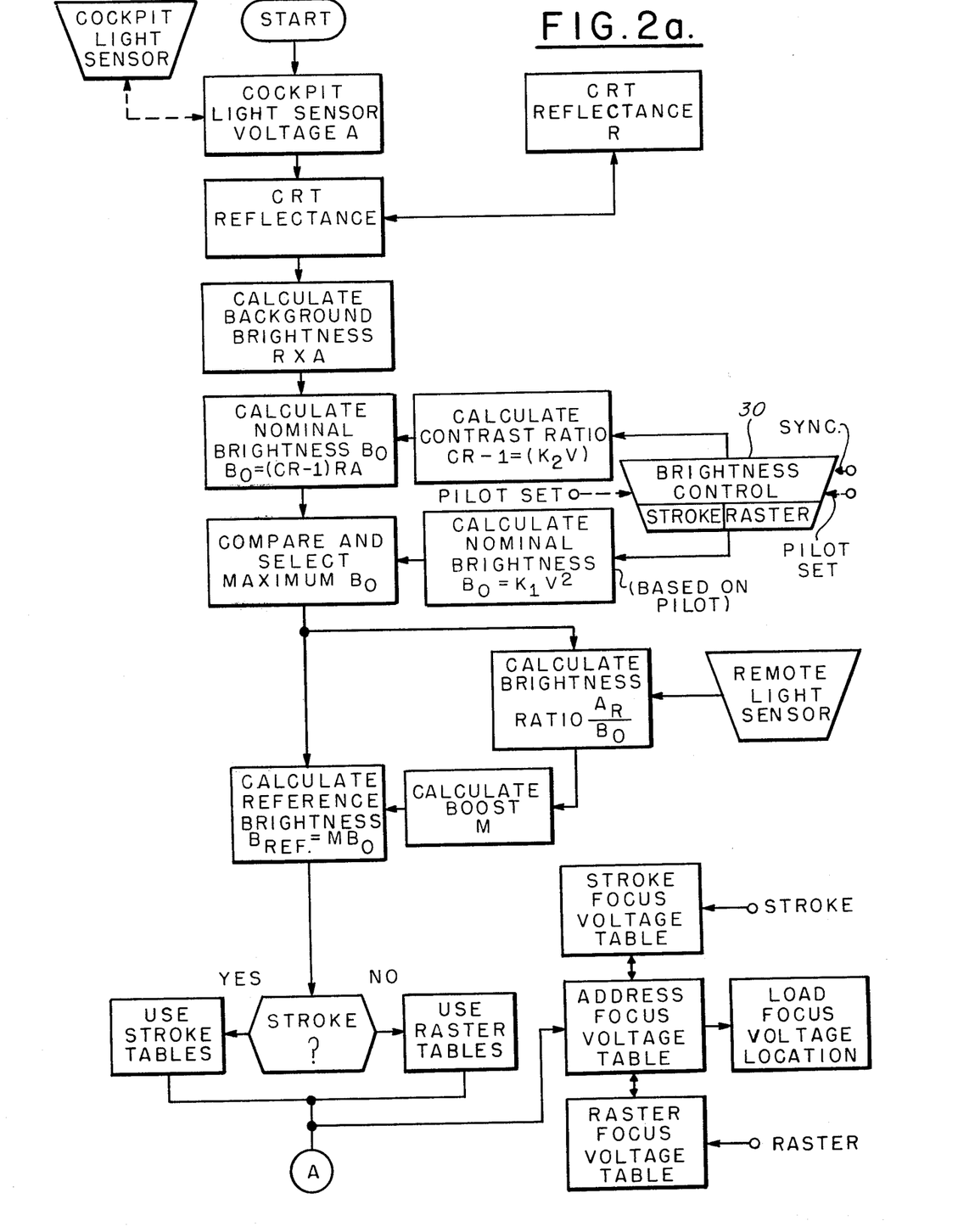
FIGS. 2A and 2B comprise a flow chart illustrating the microprocessor brightness control program stored in the controller memory which is used to compute the reference brightness parameter and hence the focus voltage of the present invention.
Figure 2B:
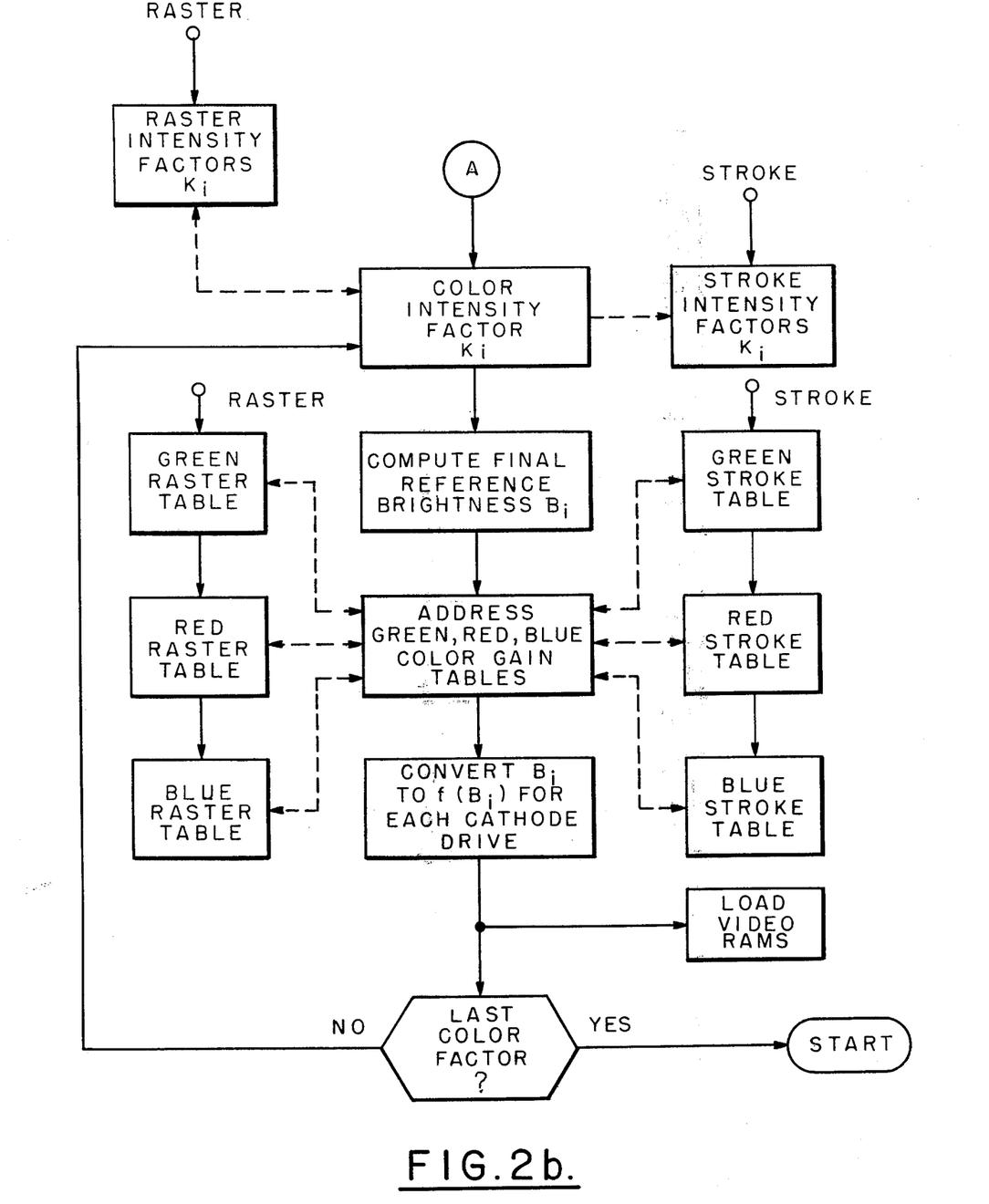

The microprocessor program or brightness computation flow chart for accomplishing this is illustrated in FIGS. 2A and 2B. In general, the program governs the computations performed by the processor for varying the contents of the video RAMS 16 in accordance with the existing and changing ambient light conditions in the cockpit and to provide a corresponding focus voltage command to the focus power supply 42. The program which may be stored in PROM 27 or in a separate program ROM runs on its own clock and is independent of the symbol generator timing. Its execution time is very short, i.e., on the order of four milliseconds, compared to the display refresh rate which may be on the order of eighty frames per second. The symbol generator sync signal (in a raster/stroke system this may be a raster/stroke command) is used to produce, through a control block (shown in Narveson et al application Ser. No. 304,451), an update signal or program interrupt signal which freezes the then addressed brightness (cathode drive voltage) data in the PROM color brightness and focus gain tables and through conventional latches transfers the existing brightness data to the video RAMS thereby updating the RAMS to provide the cathode voltages required for the existing cockpit brightness conditions and also updating the voltage to the focus power supply required to maintain the predetermined linewidth under such cathode drive voltages. After video and focus updating, the update is reset and the microprocessor 26 continues to execute its program.

Referring to FIGS. 2A and 2B, the program flow chart is illustrated and is generally self-explanatory. The program starts with the sampling of the cockpit light sensor voltage A, A/D converted and latched onto the processor data bus. This signal is converted to a logarithmic value (log A) in terms of foot candles using well known table "look-up" techniques. Since the light falling on the sensor also falls on the display tube face, the latter's reflectance characteristic R should be included in the display brightness calculations. The value of R is a constant for a particular CRT and faceplate including any filter and is stored as a constant as a logarithmic value in the PROM 27. The program then calls for a multiplication of these terms through adding their logs, the resultant being the background brightness RA, i.e., the internal cockpit ambient light intensity in foot candles. The nominal brightness ratio $B_o$ is then calculated through an expression for the contrast ratio, $$CR = \frac{B_o + RA}{RA}.$$

The desired contrast ratio CR is determined by the setting of the pilot's brightness controller 30. In those embodiments of the invention which include the pilot's separate control of the brightness of raster written symbology and stroke written symbology, the brightness controller 30 comprises separate knob-positioned potentiometers. The program recognizes whether stroke or raster symbology is being commanded through the sync signal and which potentiometer has been activated and accordingly sets a "stroke flag" which determines which of the brightness tables derived from curves of FIGS. 3A and 3B of Narveson et al application Ser. No. 304,451 will be addressed when called for by the program. The program calls up the potentiometer signal V, converts it to log V and multiplies (adds) by a constant factor $K_2$ stored as a log value in memory, the constant $K_2$ scaling the product to read directly in foot lamberts. At low ambient light levels, the contrast ratio CR potentially is very large while at high ambients it is low. Therefore, under low ambient conditions the display brightness should be based on absolute brightness and at higher ambients it should be based on contrast ratio. To compute this nominal brightness the potentiometer signal is "squared" (log V is added to log V) and multiplied by a constant $K_1$ to convert the result to foot lamberts (log $K_1$ added to 2 log V). It will be appreciated that functions of the pilot's brightness control other than squaring may be utilized in accordance with desired results. The program compares the two values of nominal brightness and selects the maximum, which value is used in the remainder of the programmed computations. Thus, it will be noted that at high ambients the brightness of the displayed symbology is controlled primarily in accordance with the ambient light sensor signal as modified by CRT reflectance characteristics and a desired contrast ratio, while at lower ambients, the brightness of the displayed symbology is controlled primarily in accordance with a nominal brightness set by the pilot.

As stated earlier, a remote light sensor 32 preferably mounted on the cockpit glare shield looks out the front windshield and hence provides a measure of the sky brightness to which the pilot's eyes are subjected when he is looking outside the cockpit. Since the iris of the human eye is quite slow in responding to abrupt changes in light intensities, such as when the pilot is looking out the windshield and then looks at his instrument display, the program has been provided with means for compensating for this physiological characteristic by calculating a brightness boost factor M. This compensation is most valuable when the outside brightness is substantially greater than the inside brightness. Because the internal light sensor adjusts the display brightness for internal light conditions, the display brightness may not be sufficient for the pilot to immediately respond thereto and therefore the display brightness level should be boosted. The program calls up the remote light sensor signal $A_R$, converts $A_R$ to log $A_R$, and determines the ratio thereof with the nominal (internal) brightness $B_o$ by subtraction of logs. If the value of this ratio is less than some predetermined value, dependent at least in part upon the eye's physiology, a first relatively low value, substantially constant boost factor is provided (at the lower exterior brightness the boost factor may remain constant); if greater than that predetermined ($A_R/B_o$ value, a second boost factor is provided which varies, i.e., increases, substantially linearly from the predetermined constant value to a predetermined maximum value in accordance with increases in exterior light conditions. The boost factor M is converted to log M. The nominal brightness $B_o$ and boost factor M are multiplied, their logs added, to provide the basic reference brightness $B_{REF}$ for the display system.

After the reference brightness for the existing ambient cockpit lighting has been calculated, the program determines whether or not the stroke flag has been set. If not, i.e., raster symbology is being commanded and the raster intensity factor tables and the raster color/gain tables for the three primary colors are utilized in the ensuing computations. If the stroke flag has been set, the stroke tables are utilized all as described in the Narveson et al application Ser. No. 304,451.

Since the brightness of a display symbol on the CRT screen is a function of the electron beam width which in turn is a function of the cathode drive, and since it is desired to maintain a constant, predetermined beam width which will not result in roping and moire effects, it is necessary to adjust the electron beam focus in accordance with the reference brightness. The reference brightness signal is therefore used to address the focus voltage versus brightness gain tables to provide the predetermined focus voltages $V_F$ for controlling the focus power supply 42. The microprocessor loads the addressed focus voltage into a preset location in memory for outputting on the data bus 37 to the focus power supply at the appropriate time. The appropriate focus voltage table (stroke or raster) is activated by the "stroke flag" as required.

Alternatively, the focus voltage $V_F$ may be calculated as a function of the reference brightness by other means. If the character of the focus voltage versus reference brightness curves are analytically determinable, the focus voltage $V_F$ may be calculated by utilizing coefficients for the curves stored in the PROM 27. It was determined in the present embodiment that the curves of FIG. 3, when plotted in a semi-logarithmic format are substantially straight lines. Since, as described in the Narveson et al application Ser. No. 304,451, the computations of the flow charts of FIGS. 2A and 2B are performed logarithmically, the focus voltage $V_F$ may be derived from the reference brightness signal by storing, in the PROM 27, only those parameters required to define these linear relationships. Such parameters may include one point and the slope of the line or two points on the line.

Figure 4:
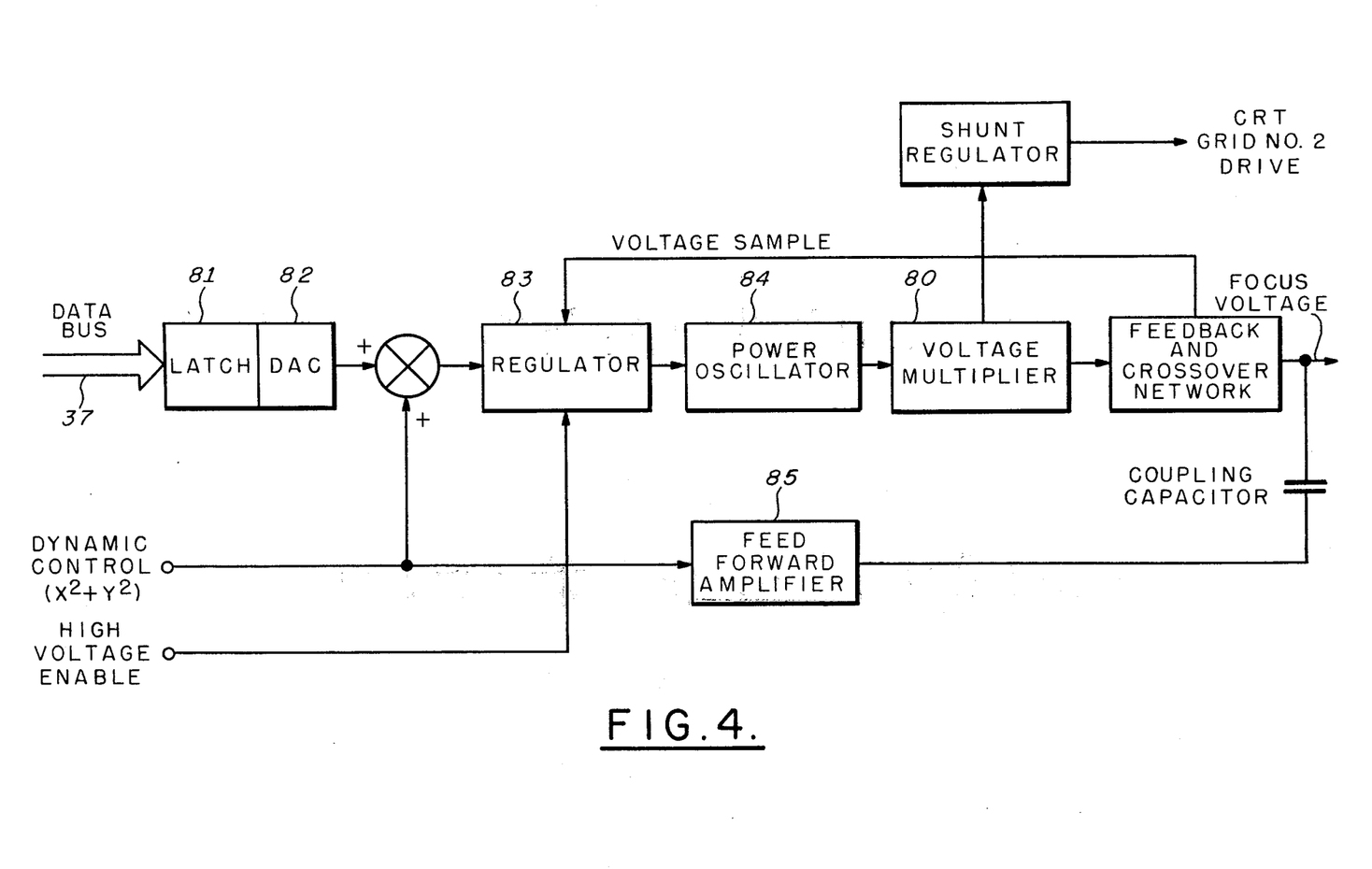
FIG. 4 is a block diagram of a dynamic focus power supply suitable for use with the present invention.

Referring to FIG. 4, a preferred dynamic focus power supply is schematically illustrated. This system is disclosed in detail in the above referenced U.S. Pat. No. 4,258,298. Briefly, the focus power supply is responsive to $V_F$ on the data bus 37 and hence to the reference video brightness and also to the instantaneous beam position and provides a display that maintains the predetermined beam width over the entire screen area. The power supply uses a high frequency feed forward path coupled with a low frequency, closed loop feedback to provide a substantially flat response d.c. to about 100 KHz. A conventional voltage multiplier 80 is used in a regulated supply to produce the d.c. and low frequency control of the focus voltage. Regulation is obtained by regulator 83 utilizing a feedback voltage sample. The reference low frequency focus voltage is $V_F$ derived from the PROM 27 via bus 37, latch 81 and DAC 82. Small low frequency changes of the focus voltage are made by amplitude modulation of the drive to the power oscillator 84. This provides a frequency response of the regulator from d.c. to 2 KHz. The feed forward amplifier 85 extends the overall response out to 100 KHz for harmonics of the dynamic control term $X^2+Y^2$. Amplifier 85 drives a step up pulse transformer (not shown), and its secondary capacitor couples the high frequency components onto the focus output. Stability is ensured by a cross-over network at the output of the supply as disclosed in the Hilburn et al patent. The high voltage enable signal which, in the present embodiment, originates from the controller 25 allows the focus supply 42 to be turned on simultaneously with the CRT anode voltage, thereby preventing any overstresses on the supply.

The above described embodiment of the invention was explained in terms of a microprocessor with the control program described above with respect to the flow charts of FIGS. 2A and 2B. The computer architecture illustrated in FIG. 1 is conventional and well known to those skilled in the art. Alternatively, the described functions may be implemented utilizing dedicated digital logic or analog circuitry.

Figure 5:
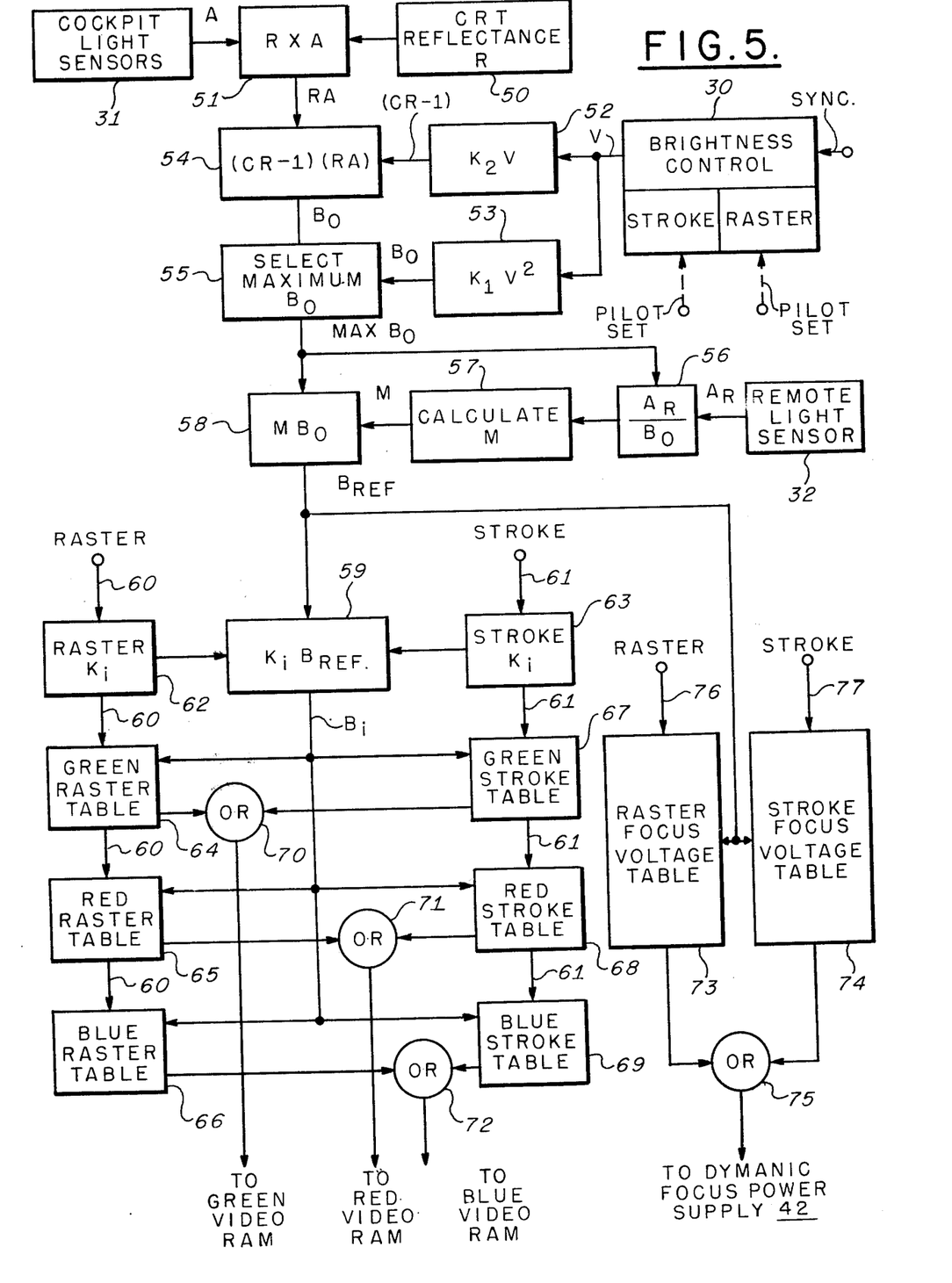
FIG. 5 is a schematic block diagram of an alternative hardware embodiment of the present invention.

Referring now to FIG. 5 in which like reference numerals indicate like components with respect to FIG. 1, a hardware embodiment of the present invention is illustrated, the blocks thereof being implemented by any convenient circuitry. It will be appreciated in a manner similar to that described above with respect to FIGS. 2A and 2B that, preferably, input signals are converted to logarithmic values by, for example, conventional table lookup techniques, stored values are stored in logarithmic fashion and multiplication and division are performed by the addition and subtraction of logarithmic values respectively. The ambient light intensity A from the cockpit light sensors 31 and the CRT reflectance value R stored at 50 are combined in block 51 to provide the value RA. The pilot set brightness control potentiometers 30 provide the output V which is the value from the stroke potentiometer or the raster potentiometer as selected by the SYNC signal. The signal V is multiplied by the constant $K_2$ in the block 52 to form the quantity $(CR-1)$. The nominal brightness $B_o$ is provided in the block 53 by forming $K_1V^2$. The contrast ratio signal from the block 52 is applied to a block 54 to be combined with the signal RA to form the nominal brightness $B_o$ based on contrast ratio. The values of $B_o$ from the blocks 53 and 54 are applied to a maximum value selector 55 which selects the maximum $B_o$. The output of the maximum value selector 55 is applied as an input to a block 56 which is also responsive to the output of the remote light sensor 32. The block 56 provides the brightness ratio $A_R/B_o$ to a block 57 wherein the boost factor M is computed in the manner described above. The maximum nominal brightness $B_o$ and the boost factor M are combined in a block 58 to provide the reference brightness $B_{REF}$.

In the manner described in the Narveson et al application Ser. No. 304,451, the $B_{REF}$ signal is utilized with the components 59–72 of FIG. 5 to provide video data to the video RAMS 16. In accordance with the present invention, the $B_{REF}$ signal from the block 58 is also applied to raster focus voltage table 73 and stroke focus voltage table 74. The tables 73 and 74 are activated in accordance with whether the sync signal designates raster or stroke as controlled by the raster and stroke activating signals on the lines 76 and 77. It is appreciated that the raster and stroke signals on the lines 76 and 77 may be the same as the signals on the lines 60 and 61, respectively. The $B_{REF}$ signal is applied to the tables 73 and 74 for converting the $B_{REF}$ signal to a corresponding focus voltage to be applied to the dynamic focus power supply 42 as described above. Accordingly, the outputs from the tables 73 and 74 are applied to the dynamic focus power supply 42 via an OR gate 75. In the present embodiment of the invention, the conversion from $B_{REF}$ to the focus voltage is via a table lookup in either the table 73 or 74. It is appreciated that the tables 73 and 74 are established from the respective raster and stroke curves of FIG. 3 as described above.

From the foregoing, it is now evident that the present invention provides in a shadow-mask or other phosphor dot or strip patterned screen color CRT display system for use under widely variable ambient light conditions apparatus for maintaining a predetermined substantially constant beam width and therefore spacing for raster relative to the screen pattern dimensions to prevent or substantially reduce roping or moire effects in the displayed symbology regardless of the cathode drive necessary to produce a variable display brightness under such variable light conditions. The apparatus includes means for storing a plurality of predetermined focus voltages required to produce the constant beam width as a function of the display brightness over the range of brightnesses, means for continuously tracking the ambient light conditions, means for continuously computing a reference display brightness therefrom and means responsive to the reference brightness for recovering from the stored values, the focus voltage required to produce the said beam width. It is appreciated that the means for storing the plurality of predetermined focus voltages encompasses the embodiments described above wherein a small number of values and parameters are stored for computing further values from the shape of the focus voltage versus reference brightness curves.

While the invention has been described in its preferred embodiments, it is to be understood that the words which have been used are words of description rather than limitation and that changes may be made within the purview of the appended claims without departing from the true scope and spirit of the invention in its broader aspects.

We claim:

1. Cathode ray tube beam focus tracking control apparatus for reducing roping and moire effects in a color cathode ray tube display instrument system subjected to viewing under a wide range of ambient light conditions comprising
    (a) a cathode ray tube having a display screen comprised of a predetermined phosphor dot pattern, beam deflection means and a plurality of beam producing cathode means for producing color images by deflecting the cathode beams along paths of predetermined width to excite corresponding dots of said dot pattern, said predetermined width of said paths being such as to reduce said roping and moire effects,
    (b) focus electrode means and means for energizing said focus electrode means for controlling said beam path width,
    (c) ambient light sensor means for providing a signal corresponding to the range between the extremes of ambient light conditions existing in the vicinity of said display instrument,
    (d) computer means including
        (i) memory means containing data representing the focus electrode means energizations required to produce said predetermined beam path width over said range of ambient light conditions, and
        (ii) processor means responsive at least in part to said light sensor means for continuously computing a reference display brightness and for deriving from said memory means focus electrode energization data required to produce said predetermined beam width at the existing ambient light conditions, and
    (e) means for supplying said energization data to said focus electrode energization means for energizing said focus electrode to thereby produce said predetermined beam width at the existing ambient light conditions.

2. The apparatus as set forth in claim 1 wherein the width of said paths are greater than the maximum width of said dot pattern.

3. The apparatus as set forth in claim 1 in which said computer means comprises digital computer means.

4. The apparatus as set forth in claim 1 further including
    (a) manual brightness control means for supplying a signal corresponding to a desired display brightness, and
    (b) means for supplying said desired brightness signal to said processor means for computing said reference brightness as a function of both said ambient light sensor signal and said manually controlled brightness signal.

5. The apparatus as set forth in claim 4 wherein said computed reference display brightness is based primarily on said light sensor signal for relatively high ambient light conditions and is based primarily on said manual control brightness signal for relatively low ambient light conditions.

6. The apparatus as set forth in claim 1 wherein said display system is installed in an aircraft cockpit, said system further comprising remote light sensor means responsive to the lighting conditions exteriorly of said aircraft cockpit and for supplying a signal in accordance therewith, and means for supplying said last mentioned signal to said processor means for computing a reference brightness boost factor as a function of said ambient light sensor signal and said remote light sensor signal.

7. The apparatus as set forth in claim 1 wherein said predetermined paths generate at least two images, one stroke written and one raster written,
    (a) wherein said memory means further includes data representing the focus electrode energization required to produce said predetermined beam width for each image over said range of ambient light conditions, and
    (b) wherein said processor means further includes means responsive at least in part to said light sensor means for continuously and independently computing a reference display brightness for each of said images and for deriving from said memory means focus electrode energization data required to produce said predetermined beam width for each of said images at the existing ambient light conditions.

8. The apparatus as set forth in claim 3 wherein
    said digital computer means includes means for converting said signal from said light sensor means into an equivalent logarithmic signal,
    said data contained in said memory means is stored in logarithmic format, and
    said processor means comprises means for computing said reference display brightness and for deriving said focus electrode energization data by linear combinations of logarithmic values.

9. A method of operating a color cathode ray tube (CRT) display instrument, which is viewable under a wide range of ambient light conditions, with the aid of a digital computer, comprising
    (a) providing said computer with a stored data base peculiar to said CRT display including a plurality of beam focus electrode excitations required to produce a predetermined constant beam width for a corresponding plurality of brightnesses of the CRT's display emissions,
    (b) constantly measuring the ambient light conditions in the vicinity of said display,
    (c) constantly providing the computer with said ambient light measure,
    (d) repetitively calculating in the computer at a rate substantially greater than the refresh rate of said CRT display, a reference display brightness compatible with said ambient light conditions, and
    (e) repetitively extracting from said data base at said calculation rate a focus electrode excitation corresponding to the brightness of said emission for the existing ambient light conditions.

* * * * *